Patented Oct. 5, 1926.

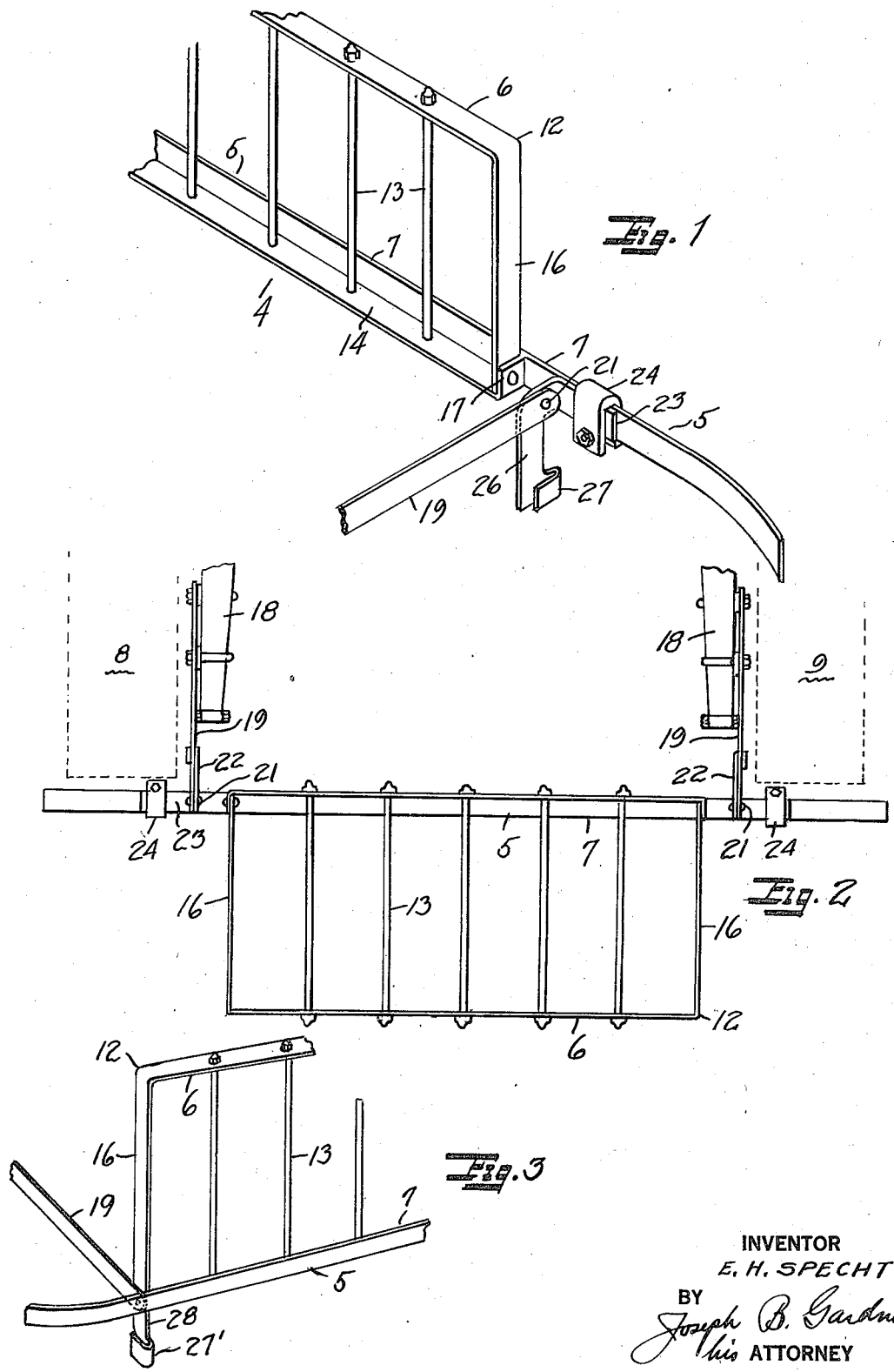

1,602,176

UNITED STATES PATENT OFFICE.

EDWARD H. SPECHT, OF OAKLAND, CALIFORNIA.

COMBINED BUMPER AND CARRIER.

Application filed December 31, 1924. Serial No. 758,993.

My invention relates to a device attachable to the rear end of an automobile to serve both as a means of carrying luggage and protecting the automobile against rear end collisions. More particularly, the invention relates to combined bumper and carrier devices of the type first disclosed in my Patent 1,522,339, granted January 6, 1925, and which involves a bumper and carrier so mounted with respect to each other and to the automobile that the bumper, although associated with a movable carrier, will not have its effectiveness impaired in any position of the carrier, especially as to the protection of the side portions of the automobile, such as the fenders.

An object of the invention is to provide a device of the character described which will permit a rigid connection between the bumper and carrier.

Another object of the invention is to provide a device of the character described which may be attached to different makes and designs of automobiles without requiring the use of special parts or necessitating variation in the size and form of the device.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings,

Figure 1 is a perspective view of a portion of the device of my invention viewing it forwardly thereof and in upright position.

Figure 2 is a plan view of the device showing it attached to an automobile and in extended position.

Figure 3 is a fragmentary perspective view of a slightly modified form of the device.

The device of my invention, as previously stated, is particularly adapted for attachment to and positioning at the rear end of an automobile, and includes a structure 4 having portions 5 and 6 which may for convenience be respectively termed a bumper and a carrier, although each cooperates with the other to function jointly as such.

In the present embodiment of the invention, the bumper portion 5 comprises a single bar 7 which is arranged to extend transversely across the automobile from the rear of one back fender 8 of the automobile to the other back fender 9. The carrier as here shown comprises a rack having a rectangular frame 12 in which is held a plurality of parallel panels 13. The carrier rack is arranged to be rigidly fixed to the bumper bar, and may be formed integral therewith or welded thereto. As illustrated, the base rail 14 of the rack frame is positioned at right angles to the bumper and is welded thereto, and the side rails 16 of the frame are preferably riveted or otherwise secured to angular extensions 17. It will thus be noted that the carrier frame and bumper bar cooperate to materially reinforce each other's strength.

Means are provided for attaching the device to the automobile so that it may be held vertically disposed and thereby serve as a guard for the rear end of the automobile or moved from such position to a horizontal one wherein it may serve as a support for a trunk or the like, and continue to serve as a protection for the automobile, particularly the rearwardly projecting portion of the back fenders thereof. Preferably attached to the longitudinal frame members 18 of the automobile in a suitable manner and extending rearwardly therefrom are a pair of brackets 19 to which are pivotally attached by means of pivot bolts 21 a pair of movable brackets 22. The latter include angular extensions 23 which are arranged to be adjustably secured to the bumper rail 7 by means of clamps 24. It will now be clear that the device may be swung about a horizontal axis to assume either of the positions previously referred to. The adjustment between the bumper and brackets, as clearly shown in Figure 1, permits of the latter being secured to the former in any of a wide range of different positions longitudinally of the bumper. In this manner the same size and form of device may be attached to different automobiles regardless of the usual differences in the distance between the longitudinal frame members, or other parts to which the fixed brackets may be secured.

Means are provided for limiting the movement of the device when the carrier is swung downwardly to a horizontal position. In the present embodiment of the invention such means are incorporated with the brackets and include an angular extension 26 provided on each of the brackets 22 and formed with a stop 27 which is arranged to abut and frictionally engage the associated bracket 19 when the carrier is extended.

It is to be noted that the sides 16 of the carrier rack lie inwardly of the bumper extremities and that the connection of the brackets with the bumper is also inwardly of such extremities; it will be clear, therefore, that while the central portion of the bumper will be comparatively rigid, the end portions thereof will be comparatively resilient and yielding.

In Figure 3, I have shown a slightly modified construction. In this embodiment the brackets 22 are omitted, the brackets 19 being pivoted directly to the bumper and carrier structure, and the stop 27' is formed on an extension 28 of the side bars of the carrier rack.

I claim:

1. In means of the character described, a carrier, a bumper arranged to extend across an automobile at an end thereof, and means attached to the automobile for pivotally supporting said carrier and bumper and positioned inwardly of the ends of the bumper and outwardly of the ends of the carrier.

2. In means of the character described, a bumper arranged to extend transversely across an end of an automobile from substantially one fender thereof to the other, a luggage carrier supported by said bumper, and means attachable to the automobile adapted to pivotally carry said bumper whereby said bumper may be rotated to place said carrier in substantially vertical or horizontal positions.

3. In means of the character described, a bumper arranged to extend transversely across an end of an automobile from substantially one fender thereof to the other, a luggage carrier associated with said bumper, and means attachable to the automobile adjustably secured to one of said last mentioned elements and arranged to support said carrier and bumper for rotation relative to the automobile.

4. In means of the character described, a bumper member arranged to extend transversely across an end of an automobile, a luggage carrier mounted thereon, and means attachable to the automobile secured to said bumper member to permit transverse adjustment and rotation of said member relative thereto.

5. In means of the character described, a bumper arranged to extend transversely across an end of an automobile and means adjustably secured to said bumper to attach the same to the automobile and arranged to support the bumper for rotation relative to the automobile.

6. In means of the character described, a bumper arranged to extend transversely across an end of an automobile, bumper supporting means attachable to the automobile arranged to support the bumper for adjustment transversely thereof and for rotation relative to the automobile, a luggage carrier rack supported by said bumper for movement therewith and arranged to be held substantially vertically or horizontally disposed, and means for limiting the rotative movement of the bumper when the carrier rack is horizontally disposed.

7. In means of the character described, a bumper arranged to extend transversely across an end of an automobile, a carrier rack supported thereby for movement therewith, bumper supporting means including an element arranged to be attached to the automobile and an element pivotally connected to said first element and adjustably connected to the bumper.

8. In means of the character described; a bumper arranged to extend transversely of an end of an automobile; bumper supporting means including a fixed bracket arranged to be secured to the automobile and a movable bracket pivotally connected to said first bracket and adjustably connected to the bumper; a luggage carrier rack attached to said bumper for rotative movement therewith from a substantially vertical to a horizontal position and vice versa; and an extension on said second bracket arranged to engage the first to limit the downward movement of the carrier when in said horizontal position.

9. In means of the character described, a bumper and a luggage carrier extending transversely across an end of the automobile and pivotally secured thereto for movement about a horizontal axis, said bumper having a portion extending beyond the carrier and lying opposite a fender of the automobile.

10. In means of the character described, a bumper and a luggage carrier extending transversely across an end of the automobile and secured thereto for movement about a horizontal axis, said bumper having a portion lying opposite a fender of the automobile, said carrier having its transverse end lying inwardly of said bumper portion and of said fender.

In testimony whereof, I have hereunto set my hand at Oakland, California, this 27th day of December, 1924.

EDWARD H. SPECHT.